US009526125B2

(12) United States Patent
Chandra et al.

(10) Patent No.: US 9,526,125 B2
(45) Date of Patent: *Dec. 20, 2016

(54) TRANSFER OF DATA-INTENSIVE CONTENT BETWEEN PORTABLE DEVICES (71) Applicant: Microsoft Technology Licensing, LLC, Redmond, WA (US)

(72) Inventors: Ranveer Chandra, Kirkland, WA (US); Thomas Moscibroda, Redmond, WA (US); Ki-Woong Park, Guseong-Dong Yuseong-Gu (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,292

(22) Filed: Jul. 12, 2013

(65) Prior Publication Data
US 2013/0303138 A1   Nov. 14, 2013

Related U.S. Application Data (63) Continuation of application No. 13/071,538, filed on Mar. 25, 2011, now Pat. No. 8,509,753.

(51) Int. Cl.
*H04L 29/06* (2006.01)
*H04W 76/02* (2009.01)
(Continued)

(52) U.S. Cl.
CPC ............ *H04W 76/023* (2013.01); *H04L 67/06* (2013.01); *H04L 67/18* (2013.01); *H04W 4/023* (2013.01);
(Continued)

(58) Field of Classification Search
CPC .. H04W 76/023; H04W 4/023; H04W 76/025; H04W 84/12; H04W 88/182; H04W 92/18; H04L 67/06; H04L 67/18
(Continued)

(56) References Cited

U.S. PATENT DOCUMENTS 7,787,423 B2 *  8/2010  Komiya ................. G08C 17/02
                                                                370/255
7,860,491 B2 * 12/2010  Reich .................... H04L 67/104
                                                                370/216
(Continued)

OTHER PUBLICATIONS

Anastasi, et al., "Experimental Analysis of an Application-independent Energy Management Policy for Wi-Fi Hotspots", Retrieved at << http://citeseerx.ist.psu.edu/viewdoc/download; jsessionid=E7435B82A459A97DEE38445CCABB713B?doi=10.1.1.74.990&rep=rep1&type=pdf >>, Proceedings of the 9th IEEE Symposium on Computers and Communications (ISCC), Jun. 28-Jul. 1, 2004, pp. 1-6.

(Continued)

*Primary Examiner* — Charles Shedrick
(74) *Attorney, Agent, or Firm* — Alin Corie; Sandy Swain; Micky Minhas (57) ABSTRACT

Described herein are technologies that facilitate transfer of data-intensive content between portable telephones. Phones are configured to transmit data indicative of phone location to a proxy server by way of respective cellular network data connections. When a user of a phone wishes to acquire content that is labeled as shareable on another phone, the user of the phone initiates a location-based request, which causes the proxy server to provide a list of phones that are estimated to be in Wi-Fi range of such phone. The user thereafter selects a particular phone, and the proxy server instructs that phone to activate its Wi-Fi radio. The phone of the user additionally activates its Wi-Fi radio, and a peer-to-peer connection between phones is established. Thereafter, rich content is transferrable between the phones.

20 Claims, 8 Drawing Sheets (51) Int. Cl.
*H04W 4/02* (2009.01)
*H04L 29/08* (2006.01)
*H04W 84/12* (2009.01)
*H04W 88/18* (2009.01)
*H04W 92/18* (2009.01)

(52) U.S. Cl.
CPC ........... *H04W 76/025* (2013.01); *H04W 84/12* (2013.01); *H04W 88/182* (2013.01); *H04W 92/18* (2013.01)

(58) Field of Classification Search
USPC ............................................ 455/41.2, 414.3
See application file for complete search history.

(56) References Cited

U.S. PATENT DOCUMENTS

| | | | | |
|---|---|---|---|---|
| 7,869,792 | B1* | 1/2011 | Zhou | H04M 1/67 455/411 |
| 7,917,632 | B2* | 3/2011 | Lee et al. | 709/227 |
| 8,385,240 | B2* | 2/2013 | Krishnaswamy | H04W 40/10 370/311 |
| 2002/0028657 | A1* | 3/2002 | Davies | H04B 1/713 455/41.2 |
| 2002/0103998 | A1* | 8/2002 | DeBruine | H04L 63/0281 713/153 |
| 2002/0138744 | A1* | 9/2002 | Schleicher | H04L 63/12 713/187 |
| 2004/0203381 | A1* | 10/2004 | Cahn | H04B 5/0012 455/41.2 |
| 2005/0037708 | A1* | 2/2005 | Torvinen | H04L 29/06 455/41.2 |
| 2005/0149508 | A1* | 7/2005 | Deshpande | G06F 17/30091 |
| 2005/0266835 | A1* | 12/2005 | Agrawal | G06Q 10/10 455/414.3 |
| 2006/0023633 | A1* | 2/2006 | Caruk | G06F 1/325 370/252 |
| 2007/0258396 | A1* | 11/2007 | Tiraspolsky | H04L 67/104 370/328 |
| 2008/0133758 | A1* | 6/2008 | Lee | H04L 29/08846 709/227 |
| 2008/0137663 | A1* | 6/2008 | Gu | H04L 29/12594 370/395.3 |
| 2008/0165701 | A1* | 7/2008 | Ananthanarayanan | G06Q 30/06 370/254 |
| 2008/0188210 | A1* | 8/2008 | Choi | G04G 9/0076 455/414.3 |
| 2008/0248749 | A1* | 10/2008 | Bahl | H04W 52/0274 455/41.2 |
| 2009/0061918 | A1* | 3/2009 | Emara | H04W 52/0274 455/522 |
| 2009/0164564 | A1* | 6/2009 | Willis | G06F 17/30884 709/203 |
| 2010/0128664 | A1 | 5/2010 | Denny et al. | |
| 2012/0244847 | A1 | 9/2012 | Chandra et al. | |

OTHER PUBLICATIONS

Xie, et al., "The Peer-to-Peer Live Video Streaming for Handheld Devices", Retrieved at << http://www.cse.ust.hk/~gabriel/Paper/CCNC08.pdf >>, 5th IEEE Consumer Communications and Networking Conference, CCNC, Jan. 10-12, 2008, pp. 1-2.

Icjackson., "Turn Your Windows Mobile Phone Into a WiFi Hot Spot with WMWiFiRouter", Retrieved at << http://www.mobiletopsoft.com/board/5321/turn-your-windows-mobile-phone-into-a-wifi-hot-spot-with-wmwifirouter.html >>, Apr. 19, 2009, pp. 1-3.

Etherington, Darrell., "Apple Mulling App-Sharing System for iPhone Users", Retrieved at << http://gigaom.com/apple/apple-mulling-app-sharing-system-for-iphone-users/>>, Jun. 3, 2009, pp. 1-7.

Balasubramanian, et al., "Energy Consumption in Mobile Phones: A Measurement Study and Implications for Network Applications", Retrieved at << http://www.cs.umass.edu/~arunab/paper/tailender-imc09.pdf >>, Internet Measurement Conference, Nov. 4-6, 2009, pp. 1-14.

Pietilainen, et al., "MobiClique: Middleware for Mobile Social Networking", Retrieved at << http://conferences.sigcomm.org/sigcomm/2009/workshops/wosn/papers/p49.pdf >>, ACM SIGCOMM Conference, Aug. 16-21, 2009, pp. 49-54.

Agarwal, et al., "Wireless Wakeups Revisited: Energy Management for VoIP over Wi-Fi Smartphones", Retrieved at << http://research.microsoft.com/en-us/um/people/alecw/mobisys-2007.pdf >>, The Fifth International Conference on Mobile Systems, Applications and Services, Jun. 11-14, 2007, pp. 1-13.

"Bango", Retrieved at << http://bango.com/ >>, Retrieved Date: Dec. 22, 2010, pp. 1-2.

Seward, Julian., "Bzip2", Retrieved at << http://www.bzip.org/1.0.5/bzip2-manual-1.0.5.pdf >>, Mar. 17, 2008, pp. 1-38.

Bahl, et al., "MultiNet: Connecting to Multiple IEEE 802.11 Networks Using a Single Wireless Card", Retrieved at << http://research.microsoft.com/pubs/70012/tr-2003-46.pdf >>, Technical Report, MSR-TR-2003-46, Aug. 2003, pp. 1-22.

Deutsch, et al., "ZLIB Compressed Data Format Specification Version 3.3", Retrieved at << http://www.potaroo.net/ietf/rfc-pdf/rfc1950.pdf >>, May 1996, pp. 1-10.

Gaonkar, et al., "Micro-Blog: Sharing and Querying Content through Mobile Phones and Social Participation", Retrieved at << http://www.cs.duke.edu/~lpcox/romit-microblog.pdf >>, The 6th International Conference on Mobile Systems, Applications, and Services, Jun. 17-20, 2008, pp. 1-13.

Wikman, et al., "Providing HTTP Access to Web Servers Running on Mobile Phones", Retrieved at << http://citeseerx.ist.psu.edu/viewdoc/download?doi=10.1.1.71.5872&rep=rep1&type=pdf >>, May 24, 2006, pp. 1-6.

"Meetmoi", Retrieved at << http://www.meetmoi.com >>, Retrieved Date: Dec. 22, 2010, p. 1.

"Wall Street Journal MarketWatch: Verizon Launches 4G LTE in DC and Baltimore Metropolitan Areas by End of Year", Retrieved at << http://www.marketwatch.com/story/verizon-launches-4g-lte-in-dc-and-baltimore-metropolitan-areas-by-the-end-of-the-year-2010-10-06 >>, Oct. 6, 2010, pp. 1-2.

Virki, Tarmo., "Mobile Web Surge Continues in October: Opera", Retrieved at <<http://www.reuters.com/article/idUSTRE5AO0KM20091125 >>, Nov. 25, 2009, pp. 1-3.

"ShoZu", Retrieved at << http://www.shozu.com/portal/index.do >>, Retrieved Date: Dec. 22, 2010, p. 1.

Si, et al., "Mobility Prediction in Cellular Network using Hidden Markov Model", Retrieved at << http://ieeexplore.ieee.org/stamp/stamp.jsp?tp=&arnumber=5421684 >>, 7th Annual IEEE Consumer Communications & Networking Conference, Jan. 2010, pp. 1-5.

Xiao, et al., "Energy Consumption of Mobile YouTube: Quantitative Measurement and Analysis", Retrieved at << http://ieeexplore.ieee.org/stamp/stamp.jsp?tp=&arnumber=4756414 >>, Second International Conference and Exhibition on Next generations Mobile Applications Services and Technologies (NGMAST), Sep. 16-19, 2008, pp. 61-69.

* cited by examiner

TRANSFER OF DATA-INTENSIVE CONTENT BETWEEN PORTABLE DEVICES

RELATED APPLICATION

This application is a continuation of U.S. patent application Ser. No. 13/071,538, filed on Mar. 25, 2011, and entitled "TRANSFER OF DATA-INTENSIVE CONTENT BETWEEN PORTABLE DEVICES," the entirety of which is incorporated herein by reference.

BACKGROUND

Portable telephones are currently equipped with functionality that has recently only been available on desktop computing devices. This functionality includes web browsing, video capture, content upload, word processing, etc. Moreover, these portable telephones are becoming less and less expensive, thereby allowing a continuously large number of users to acquire telephones that are capable of performing the aforementioned functionalities.

Accordingly, a user with a smartphone can utilize such phone to browse web sites wherever they are, just as they would from a conventional personal computer. In contrast to a personal computer, however, a user will typically carry her smartphone with her most of the time. This has led to a new class of applications that allow a user to push content over the Internet from the convenience of a smartphone. For example, a user may capture video through utilization of the smartphone and can cause such video to be uploaded to a video sharing web site. In another example, the user may update a status message and cause such status message to be posted to a social networking web site.

Generally, however, pushing rich content such as video streams or large pictures over a cellular (e.g., 3G or 4G) data connection to a web-based server is data intensive, relatively slow compared to broadband connections, and, depending on a data plan corresponding to the telephone, can be expensive.

Currently, for a user of a first portable telephone to provide relatively rich content to a user of a second portable telephone, the following occurs: the user, by way of a cellular network data connection, causes the rich content to be uploaded to a web-based server. Thereafter, the user of the first portable telephone informs a user of the second portable telephone that content can be accessed by way of the web-based service (e.g., via telephone call, text message, or some automatic notification service). The user of the second portable telephone can utilize the second portable telephone to access such web-based service, and can download the rich content, again by way of the cellular network data connection. Alternatively, the user of the first portable telephone can first transfer such rich content to a personal computing device with a broadband connection, and can thereafter cause such content to be uploaded to the web-based service. The user of the first portable telephone can inform the user of the second portable telephone of the availability of the content by way of the web-based service, and the user of the second portable telephone can access such data through utilization of the second portable telephone or a personal computing device. However, this does not enable immediate sharing of relatively data-intensive content. Accordingly, it can be ascertained that several deficiencies exist with respect to sharing relatively rich content between users of portable telephones.

SUMMARY

The following is a brief summary of subject matter that is described in greater detail herein. This summary is not intended to be limiting as to the scope of the claims.

Described herein are various technologies pertaining to sharing of content between portable telephones (smartphones). In an example, such content may be relatively rich content and can be shared between two smartphones by way of a wireless peer-to-peer connection between the two portable telephones. For example, this peer-to-peer connection can be a Wi-Fi connection. A first user of a first portable telephone can label certain data thereon as being shareable with at least one other user (a second user) of a second portable telephone. Specifically, the first user can define set forth rules regarding which content on the first portable telephone is shareable with which users of other portable telephones. The second user can be provided with an indication of which content on the first portable telephone can be transferred to the second portable telephone, and can select such content for download to the second portable telephone. Responsive to receipt of this request, the first portable telephone can cause the selected shareable content to be transmitted to the second portable telephone. For instance, this content may be relatively data-intensive (rich) content such as an audio file or video file. In yet another example, this content may be a video object that is representative of video that is being captured in real-time at the first portable telephone, and this video can be streamed to the second portable telephone over the peer-to-peer connection.

As will be understood by one familiar with portable computing devices, providing power to a wireless radio that facilitates peer-to-peer connections (such as a Wi-Fi radio) can utilize a significant amount of battery power. A mechanism is described herein that facilitates causing a first portable telephone to provide power to a wireless antenna or radio only when a second portable telephone is predicted to be within wireless communication range of the first portable telephone and after the user of the first portable telephone indicates a desire to cause a wireless peer-to-peer connection to be established between the first portable telephone and the second portable telephone. In other words, the wireless radio interface is turned on "on demand", only when it is needed. This conserves battery power of portable wireless computing devices, such as portable telephones.

Pursuant to an example, portable telephones can be configured to periodically, or from time to time, provide a proxy server with data that is indicative of locations of such portable telephones. For instance, this data can be transmitted to the proxy server by way of a cellular network data connection. The data that is indicative of the location of a portable telephone may be, for instance, latitude/longitude coordinates obtained from a GPS sensor that is integral to the portable telephone. In another example, the data that is indicative of the location of the portable telephone may be observed or estimated strength of signals emitted from at least one base station that are observed at the portable telephone. If multiple portable telephones provide this location data, then an estimated relative distance between portable telephones can be computed. Accordingly, for example, the second user of the second portable telephone can cause the second portable telephone to issue a location-based query to the proxy server, which can estimate which other portable telephones are within the range of a wireless transceiver (Wi-Fi radio) of the second portable telephone. A list of users of portable telephones that are estimated to be within wireless communication range of the second portable telephone can be provided to such second portable telephone by way of the cellular network data connection.

The user of this second portable telephone may then select a username from the list, wherein the username corresponds to a user of a portable telephone (e.g., the first portable telephone) that is believed to be in wireless communication range of the second portable telephone. Subsequent to the user making such selection, data that identifies the first portable telephone can be transmitted to the proxy server by way of the cellular network data connection. The proxy server can then transmit an indication to the first portable telephone that the second portable telephone wishes to establish a peer-to-peer connection therewith. Thereafter, the second portable telephone and the first portable telephone can turn on their respective wireless radios, and can establish a peer-to-peer connection with one another by way of such wireless radios. Thereafter, data, including rich content can be exchanged between the two portable telephones.

Other aspects will be appreciated upon reading and understanding the attached figures and description.

DETAILED DESCRIPTION

Various technologies pertaining to transfer of data-intensive content between portable telephones by way of a peer-to-peer connection will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
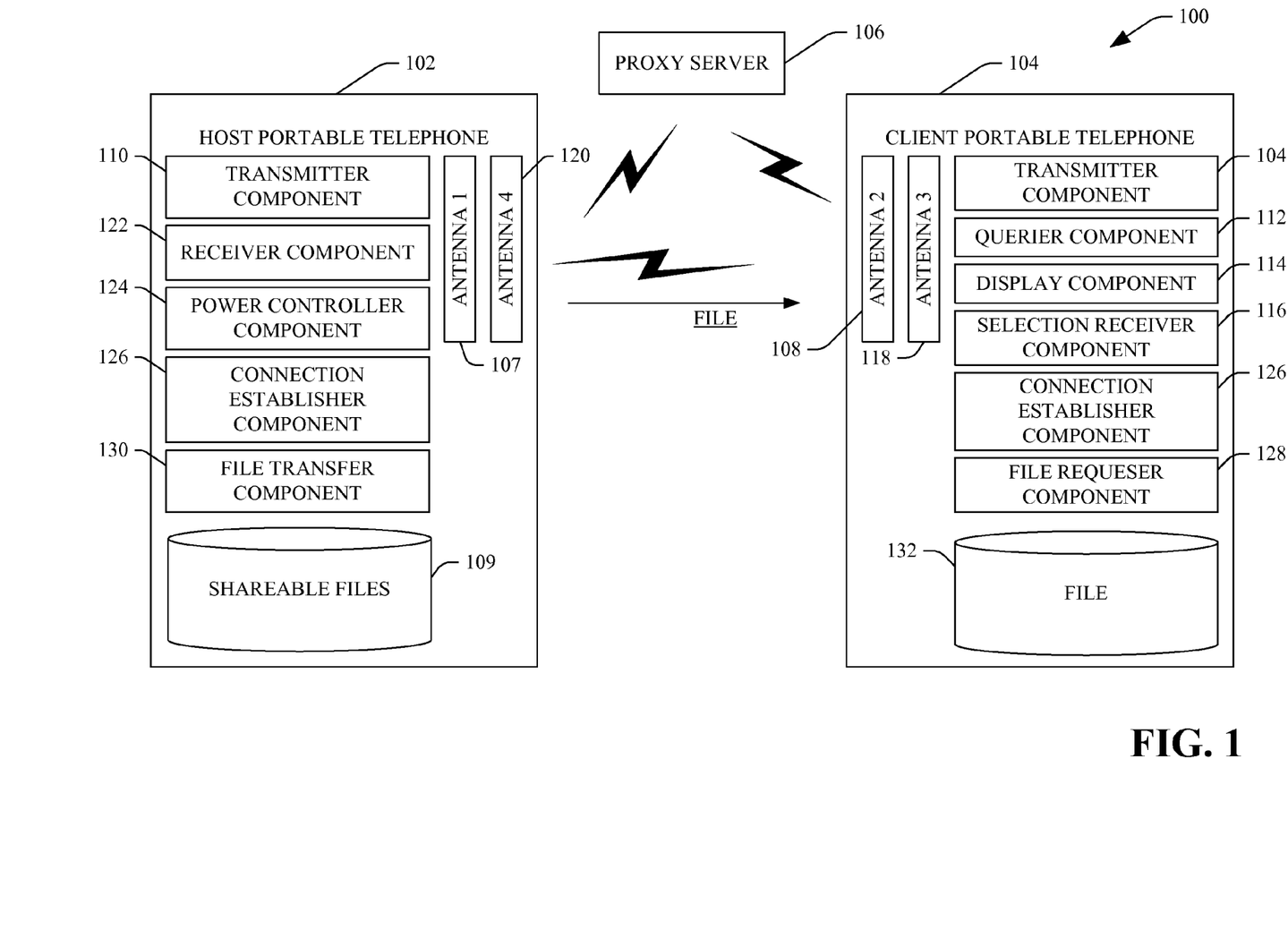
FIG. 1 is a functional block diagram of an exemplary system that facilitates transfer of data-intensive data between two portable telephones by way of a peer-to-peer connection.

With reference now to FIG. 1, an exemplary system 100 that facilitates sharing of rich content between portable telephones (smartphones) by way of a peer-to-peer connection is illustrated. The system 100 comprises a host portable telephone 102 (a first portable telephone), a client portable telephone 104 (a second portable telephone), and a proxy server 106. The proxy server 106 can be in communication with both the host portable telephone 102 and the client portable telephone 104 by respective cellular network data connections. To that end, the host portable telephone 102 can comprise a first antenna 107 that is configured to communicate with the proxy server 106 by way of a first cellular network data connection. Similarly, the client portable telephone 104 can comprise a second antenna 108 that is configured to communicate with the proxy server 106 by way of a second cellular network data connection.

The host portable telephone 102 may further comprise a data repository 109 that includes at least one file that is labeled as being shareable with other portable telephones. For example, various restrictions may be placed on the at least one file in the data repository 109 to protect the privacy of the owner of such file and/or to prevent unwanted parties from obtaining access to such file. For example, the user of the host portable telephone 102 (a first user) can restrict access to the at least one file to individuals in a contact list that has been approved by the first user. In another example, the first user can restrict access the at least one file in the data repository 109 based at least in part upon time of day, day of week, etc. Still further, the first user can restrict access to the at least one file based at least in part upon current location of the first user or location of other users that wish to access the at least one file.

The host portable telephone 102 can comprise a transmitter component 110 that includes functionality that allows the host portable telephone 102 to transmit a user profile or content summary to the proxy server 106 by way of the first cellular network data connection. For instance, the transmitter component 110 may be or include a network stack that is utilized to facilitate communications between the host portable telephone 102 and the proxy server 106. With more specificity, the first user can generate a profile and/or a summary of the at least one file resident in the data repository 109, and can cause such profile and/or summary transmitted to the proxy server 106 by way of the first cellular network data connection. The profile can be indicative of identity of the first user, interests of the first user, etc. Additionally or alternatively, the summary can identify a type of the at least one file, a thumbnail image that summarizes content of the at least one file (e.g., if the at least one file is a video file), a time stamp that identifies time of creation or modification of the at least one file, amongst other data that can summarize content of the file. Further, while the profile and summary have been described as being separate, it is to be understood that the profile and summary can be included in a single file. In any event, the profile and/or summary can be generated as a small file, for instance, in the range of KBs. Still further, the host portable telephone 102 can be configured to act as a web server, and the aforementioned profile can be a miniaturized version of a web page that is hosted on the host portable telephone 102. In this case, the profile may include data that is indicative of content of the at least one file that is labeled as being shareable with others. In any event, the profile/summary can be provided to the proxy server 106 by way of the first cellular network connection Additionally, the transmitter component 110 can be configured to transmit data that is indicative of a location of the host portable telephone 102 to the proxy server 106 by way of the first cellular network data connection. In an example, the host portable telephone 102 may comprise a GPS transceiver such that the transmitter component 110 can transmit latitude/longitude coordinates to the proxy server 106 by way of the first cellular network data connection. To facilitate preserving the privacy of the user of the host portable telephone 102, these latitude/longitude coordinates may be obfuscated or truncated, for instance, to avoid providing precise locations to the proxy server 106. In another example, the host portable telephone 102 may be configured to transmit identities of base stations in a cellular network that are in range of the host portable telephone 102 as well as strength of signals received at host portable telephone 102 from the respective base stations. Therefore, for example, if the host portable telephone 102 is in range of three base stations such that the first antenna 107 can receive signals from these three base stations, the transmitter component 110 can be configured to transmit the identities of these three base stations as well as the respective signal strengths corresponding to signals received at the first antenna 107 from such base stations.

The client portable telephone 104 additionally comprises the transmitter component 110, which is configured to periodically or from time to time transmit data that is indicative of location of the client portable telephone 104 to the proxy server 106 by way of the second cellular network data connection. This data that is indicative of the location of the client portable telephone 104 can be substantially similar to that which was described as being transmitted by the host portable telephone 102 to the proxy server 106. The client portable telephone 104 may also comprise a querier component 112 that is configured to transmit a location-based query to the proxy server 106 by way of the second cellular network data connection. For example, the querier component 112 can be configured to transmit this location-based query periodically or from time to time in an automated fashion, or can be configured to transmit the location-based query to the proxy server 106 responsive to receipt of a command from the user of the client portable telephone 104 (the second user). A location-based query generated by the querier component 112 and transmitted to the proxy server 106 by way of the second antenna 108 may be a request for identities of users of portable telephones that are estimated to be within a certain distance of the client portable telephone 104, or within wireless communication range of the client portable telephone 104. Pursuant to an example, the request may be a request for portable telephones that are in Wi-Fi communication range of the client portable telephone 104. In another example, the request may be for portable telephones that are within Bluetooth range of the client portable telephone 104. It is to be understood that over time, other suitable wireless communication protocols may be developed to allow for high bandwidth data transfer between wireless computing devices, and such protocols are contemplated and are intended to fall under the scope of the hereto appended claims.

The proxy server 106 can receive this location-based query and can estimate whether other portable telephones are within the wireless communication range (Wi-Fi range) of the client portable telephone 104. For example, the proxy server 106 can compare most recent location data of the client portable telephone 104 with most recent location data from the host portable telephone 102 to estimate whether the client portable telephone 104 is within wireless communication range of the host portable telephone 102. If, for instance, the proxy server 106 does not have a recent location of one or more of the host portable telephone 102 or the client portable telephone 104, the proxy server 106 can transmit a request to such portable telephones to obtain more recent location data. Additionally or alternatively, the portable telephones 102 and 104 can be configured with functionality that intelligently determines when data indicating the location of such portable telephones is desirably transmitted to the proxy server 106 by way of the respective cellular network data connections. For example, the host portable telephone 102 and the client portable telephone 104 can be configured with functionality that pertains to monitoring one or more sensors that are resident upon such telephones 102 and 104, such as accelerometers, GPS sensors, etc. In the example of an accelerometer, constant bouncing or quick movement of the portable telephone indicates that the portable telephone has recently changed position, while relatively little output from the accelerometer indicates that the phone has remained relatively stationary.

For instance, the proxy server 106 can estimate that the host portable telephone 102 is within wireless communication range of the client portable telephone 104 responsive to receipt of the location-based query from the client portable telephone 104. The proxy server 106 may then be configured to transmit the profile and/or summary corresponding to the first user of the host portable telephone to the client portable telephone 104 by way of the second cellular network data connection. Again, such profile/summary may be a relatively small amount of data.

The client portable telephone 104 can include a display component 114 that is configured to display data that identifies the first user of the host portable telephone 102 (e.g., a "friendly" name of the first user can be provided to the client portable telephone 104). Furthermore, the display component 114 can be configured to display profile/summary. The display component 114 can cause such information to be displayed to the user of the client portable telephone 104 on a display screen of such telephone 104.

The client portable telephone 104 may further comprise a selection receiver component 116 that receives a selection from the second user of an icon that is representative of the first user of the host portable telephone 102. This selection can indicate that the second user of the client portable telephone 104 wishes to acquire data that is marked as shareable in the data repository 109 of the host portable telephone 102. This selection of the icon by the second user can be transmitted from the client portable telephone 104 by the transmitter component 110 by way of the second antenna 108 over the second cellular network data connection to the proxy server 106.

The client portable telephone 104 may further comprise a third antenna 118, and the host portable telephone 102 may comprise a fourth antenna 120. The antennas 118 and 120 may be configured to facilitate connecting to other devices/networks by way of a protocol that may be different from the network protocol utilized to transmit data by way of the first antenna 107 and the second antenna 108. In an example, the third antenna 118 and the fourth antenna 120 may be wireless radios that are configured to communicate by way of a protocol corresponding to IEEE 802.11. Therefore, for instance, the third antenna 118 and the fourth antenna 120 may be or be included in respective Wi-Fi radios. As will be understood, Wi-Fi radios on portable telephones consume a relatively significant amount of battery power. It is desirable, then, that power not be provided to the antennas 118 and 120 (and other Wi-Fi radio components in a wireless chipset) unless and until the first and second users of the host portable telephone 102 and the client portable telephone 104, respectively, desire to establish a peer-to-peer connection with one another. It is to be noted that up to this point, power has not been provided to the antennas 118 or 120, yet the second user of the client portable telephone 104 can be provided with information that indicates portable telephones that may be connected to by way of the third antenna 118.

Responsive to the selection receiver component 116 receiving a selection of an icon that is representative of the first user of the host portable telephone 102, power can be provided to the third antenna 118. In an alternative embodiment, subsequent to the transmitter component 110 transmitting a selection of the icon that is representative of the first user, the proxy server 106 can transmit data to the client portable telephone 104 that causes power to be provided to the third antenna 118. For example, the host portable telephone 102 may be configured to act as a web server, and the proxy server 106 can be configured to assign an Internet Protocol (IP) address to the client portable telephone 104 (and the host portable telephone 102). Responsive to the client portable telephone 104 receiving the IP address assigned thereto, power can be provided to the third antenna 118.

Responsive to the proxy server 106 receiving a selection of an icon representative of the first user of the host portable telephone 102 from the second user of the client portable telephone 104, the proxy server 106 can transmit an indication to the host portable telephone 102 that a peer-to-peer connection is desirably established with the host portable telephone 102 by the client portable telephone 104. The host portable telephone 102 may include a receiver component 122 that receives this indication.

A power controller component 124 in the host portable telephone 102 can, responsive to receipt of the indication that the client portable telephone 104 desires to establish a peer-to-peer connection with the host portable telephone 102, cause power to be provided to the fourth antenna 120. Accordingly, both the third antenna 118 and the fourth antenna 120 have power provided thereto, such that a peer-to-peer connection can be established between the host portable telephone 102 and the client portable telephone 104 by way of the third antenna 118 and the fourth antenna 120, respectively.

Both the host portable telephone 102 and the client portable telephone 104 can include a connection establisher component 126 that facilitates establishing a peer-to-peer connection between the host portable telephone 102 and the client portable telephone 104 by way of the antennas 118 and 120, respectively. The connection establisher component 126 in the client portable telephone 104, for example, can be configured to transmit a beacon signal by way of the third antenna 118 that can be received at the host portable telephone 102 at the fourth antenna 120. The connection establisher component 126 at the host portable telephone 102 may be configured to reply to such beacon signal and a peer-to-peer connection between the host portable telephone 102 and the client portable telephone 104 can be established in a conventional manner.

Subsequent to the peer-to-peer connection being established between the host portable telephone 102 and the client portable telephone 104, the user of the client portable telephone 104 may request the at least one shareable file in the data repository 109 of the host portable telephone 102 by way of a file requester component 128. For instance, as mentioned above, the host portable telephone 104 can host a web page, and the at least one shareable file can be accessed by way of a link on such web page. A file transfer component 130 at the host portable telephone 102 can cause an instance of the at least one shareable file to be transmitted to the client portable telephone 104. There, the at least one shareable file can be retained in a data repository 132 of the client portable telephone 104. As mentioned previously, the at least one shareable file may be a relatively data intensive file such as a video or audio file. In another example, the host portable telephone 102 can be configured to capture video through a video camera integral thereto, and the at least one shareable file may be a video object that is selectable by the user of the client portable telephone 104. This selection causes the video captured at the host portable telephone 104 to be streamed to the client portable telephone 104 by way of the peer-to-peer connection therebetween. This streamed video may then be displayed to the user of the client portable telephone 104 by way of the display component 114. In still yet another example, a microphone on the host portable telephone 102 may be capturing audio, and the file transmitted by way of the peer-to-peer network may be audio that is streamed from the host portable telephone 102 to the client portable telephone 104.

In an exemplary embodiment, the host portable telephone 102 may have a web server executing thereon, such that the host portable telephone 102 hosts a web page that is accessible to the client portable telephone 104. As mentioned above, the proxy server 106 can assign, at least temporarily, IP addresses to the host portable telephone 102 and the client portable telephone 104. The client portable telephone 104 can have knowledge of the IP address of the host portable telephone 102, and can access the web page that is hosted by such host portable telephone 102 through utilization of the IP address. The at least one shareable file in the data repository 109 may be linked to by the web page hosted by the host portable telephone 102. Therefore, through utilization of a web browser executing on the client portable telephone 104, the user of the client portable telephone 104 can select particular content that is desirably retrieved from the host portable telephone 102 and transferred to the client portable telephone 104.

While the host portable telephone 102 and the client portable telephone 104 have been described in the context of a content host and content client, it is to be understood that both the host portable telephone 102 and the client portable telephone 104 can act as a host or recipient. Moreover, in some instances, multiple portable telephones may wish to connect simultaneously with the host portable telephone 102 to retrieve content labeled as shareable that resides in the data repository 109 of the host portable telephone 102. This can be enabled through utilization, for instance, of the virtual Wi-Fi protocol. Moreover, in some cases the host portable telephone 102 may be sharing content that is popular and therefore requested by multiple other users of portable telephones simultaneously or in rapid succession. The host portable telephone 102, for instance, can maintain a list, for each shareable file, of portable telephones that have recently acquired the file from the host portable telephone 102. Therefore, for instance, if a relatively large number of portable telephones request that file, the host portable telephone 102 can respond to the request with the list of identities of other users that have previously received such file from the host portable telephone 102, and a recipient of such list may then attempt to establish a peer-to-peer connection with a different portable telephone that is known to retain such file.

In summary, the system 100 described above facilitates power conservation by only causing the third antenna 118 and the fourth antenna 120 (and other components of wireless radios on the host portable telephone 102 and the client portable telephone 104) to be provided with power when a user of the client portable telephone 104 has received an indication that the host portable telephone 102 is within wireless communication range of the client portable telephone 104, and subsequent to the client portable telephone 104 indicating that the user of such telephone 104 wishes to establish a peer-to-peer connection with the host portable telephone 102. Moreover, the system 100 facilitates establishing a relatively high bandwidth peer-to-peer connection between portable telephones, thereby allowing the transfer of rich content between such portable telephones.

Figure 2:
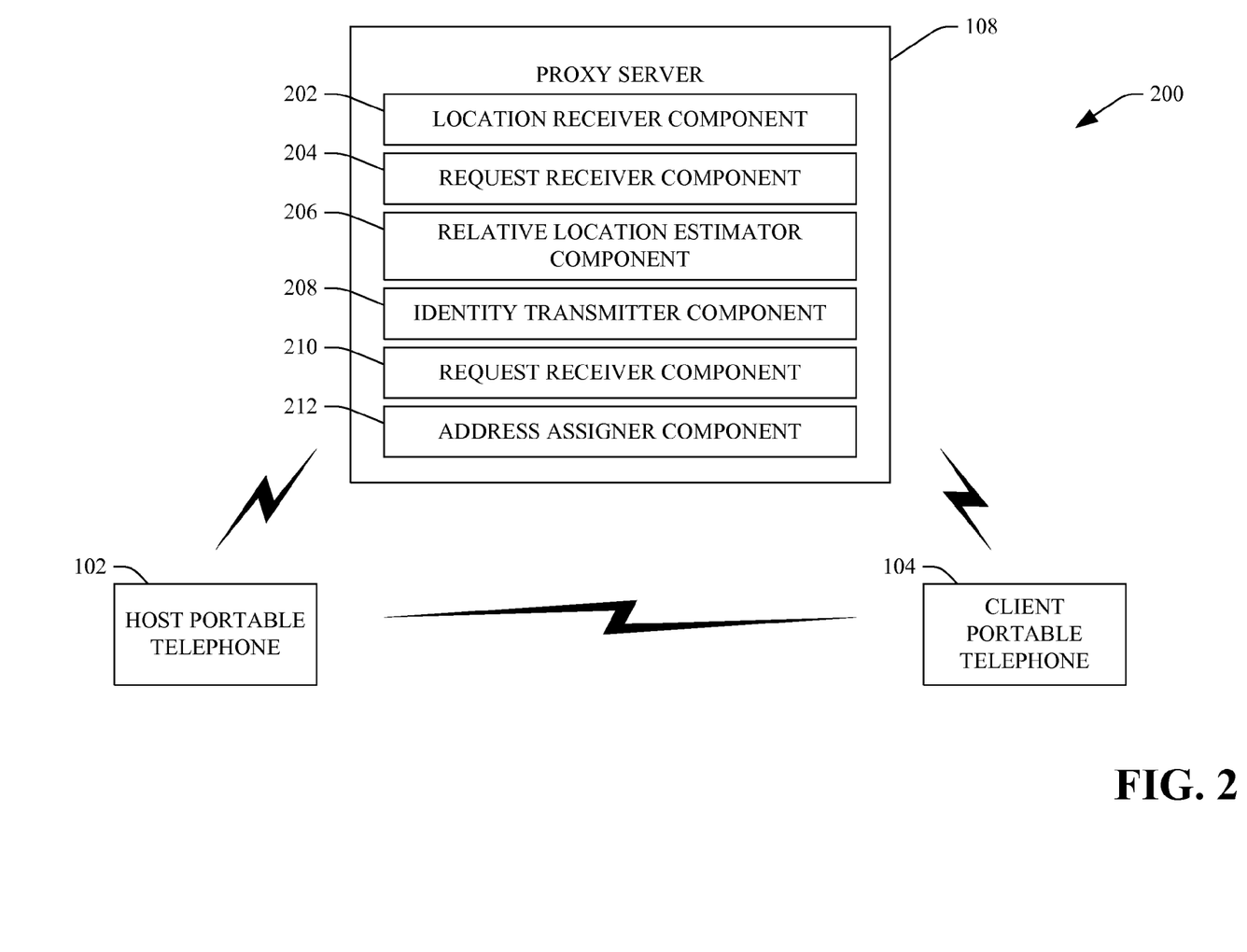
FIG. 2 is a functional block diagram of an exemplary system that facilitates establishing a peer-to-peer connection between two portable telephones.

With reference now to FIG. 2, an exemplary system 200 that facilitates transference of rich content between portable telephones is illustrated. The exemplary system comprises the host portable telephone 102, the client portable telephone 104, and the proxy server 106. Again, the proxy server 106 is in communication with the host portable telephone 102 and the client portable telephone 104 by way of respective cellular network data connections. The proxy server 106 comprises a location receiver component 202 that periodically or from time to time receives data from the host portable telephone 102 and/or the client portable telephone 104 that is indicative of location of the host portable telephone 102 and/or the client portable telephone 104.

The proxy server 106 further comprises a request receiver component 204 that receives a location-based query from the client portable telephone 104 by way of the second cellular network data connection. A relative location estimator component 206, responsive to the request receiver component 204 receiving the location-based query, can estimate a relative distance between the host portable telephone 102 and the client portable telephone 104 based at least in part upon most recent location data pertaining to the host portable telephone 102 and the client portable telephone 104. Moreover, the relative location estimator component 206 can, in general, ascertain which portable telephones are within wireless communication range of the client portable telephone 104. For example, the proxy server 106 can maintain a database that comprises identities of users of portable telephones and most recent locations pertaining to such users. In addition, the proxy server 106 can purge location data if such location data becomes too aged.

If the relative location estimator component 206 estimates that the host portable telephone 102 is within wireless communication range of the client portable telephone 104, then an identity transmitter component 208 can transmit the profile of the first user of the host portable telephone 102 to the client portable telephone 104, wherein the proxy server 106 maintains such profile in a database of profiles. In an example, the proxy server 106 can maintain the profile pertaining to the first user.

The second user can view a display of the client portable telephone 104, which includes the profile transmitted by the identity transmitter component 208 to the client portable telephone 104. This indicates to the second user that the host portable telephone 102 is estimated to be within wireless communication range of the client portable telephone 104. The second user may then indicate a desire to establish a peer-to-peer connection with the host portable telephone 102. This can be transmitted to the proxy server 106 in the form of a connection request. A request receiver component 210 on the proxy server 106 can receive such request. The request receiver component 210 can be in communication with an address assignor component 212, which is configured to assign, for instance, IP addresses to the host portable telephone 102 and the client portable telephone 104, respectively. The proxy server 106 may then transmit the IP address assigned to the client portable telephone 104 and the host portable telephone 102 to the client portable telephone 104 by way of the second cellular network data connection. Further, the address assignor component 212 can cause the address assigned to the host portable telephone 102 to be transmitted to the host portable telephone 102. Responsive to receipt of the respective IP addresses, the host portable telephone 102 and the client portable telephone 104 can cause Wi-Fi radios thereon to become active (provided with electrical power).

Thereafter, the client portable telephone 104 can request a peer-to-peer connection with the host portable telephone 102, and such peer-to-peer net connection can be established therebetween. Subsequently, through utilization of the IP address assigned to the host portable telephone 102, the client portable telephone 104 can retrieve a web page hosted by the host portable telephone 102. Content that is marked as shareable may be linked by way of the web page, and by selection of one of such links, the client portable telephone 104 can request transmittal of a file from the host portable telephone 102 to the client portable telephone 104. This file may then be transmitted by way of the peer-to-peer Wi-Fi connection between the host portable telephone 102 and the client portable telephone 104. After the content has been received by the client portable telephone 104, the peer-to-peer connection can be terminated and the Wi-Fi radios in the host portable telephone 102 and the client portable telephone 104 can be disabled (thereby conserving battery power).

Figure 3:
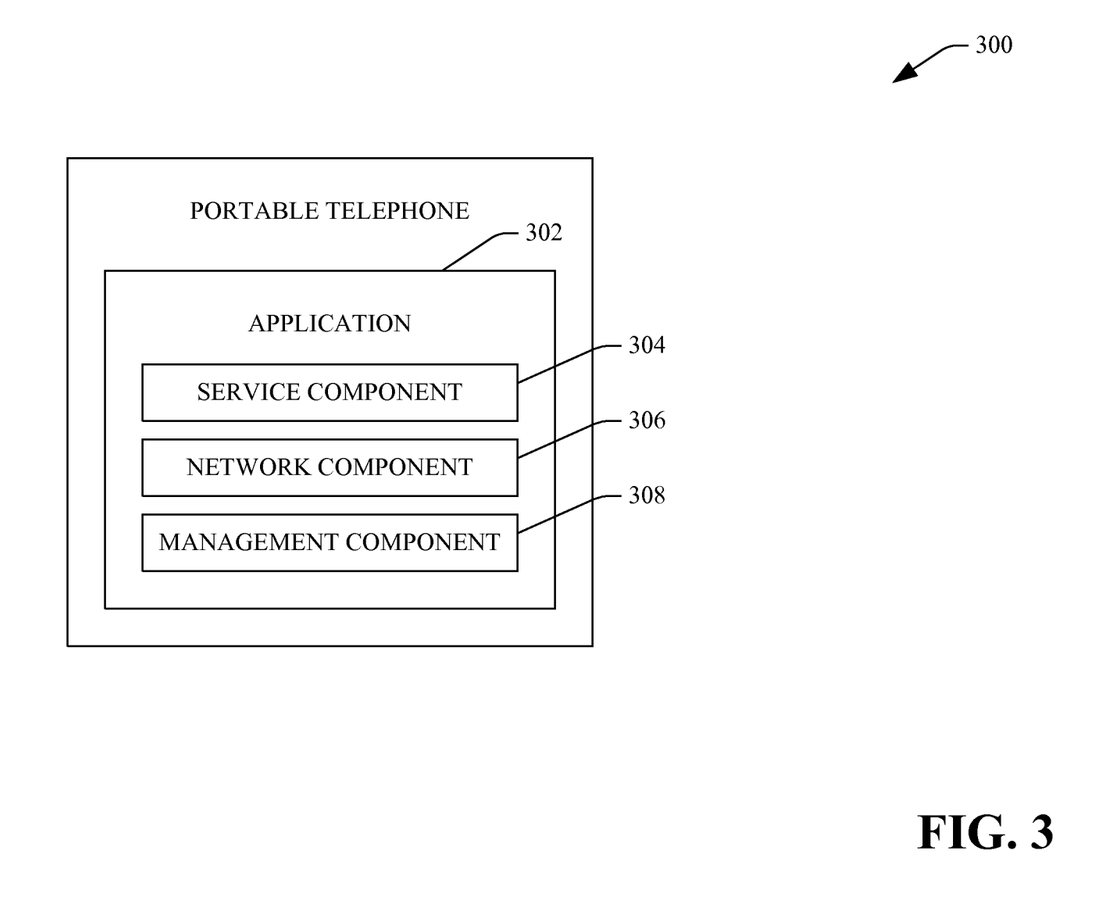
FIG. 3 is a functional block diagram of an exemplary portable telephone.

With reference now to FIG. 3, a functional block diagram of an exemplary portable telephone 300 that can be configured to act as a web server and/or can be configured to request at least one file from another portable telephone that is acting as a web server is illustrated. The portable telephone 300 can therefore be either of the host portable telephone 102 or the client portable telephone 104. The portable telephone 300 may have an application 302 executing thereon, wherein such application 302 facilitates transmitting and receiving content from and to another portable telephone by way of a peer-to-peer connection. Pursuant to an example, the application 302 can be configured as a portion of an operating system that is executing on the portable telephone 300. The application 302 comprises three primary components: a service component 304, a network component 306, and a management component 308. The service component 304, for example, implements web server functionality. In other words, the service component 304 allows the portable telephone 300 to act as a web server.

The network component 306 is utilized to establish a peer-to-peer connection between the portable telephone 300 and nearby phones. The management component 308 is configured to coordinate interaction between the portable telephone 300 and another portable telephone that is connected to such portable telephone 300 by way of a peer-to-peer connection, and is also configured to communicate with the proxy server 106.

With more specificity, the service component 304 may be a web server that is executing on the portable telephone 300, wherein such web server can be configured to limit a number of parallel connections to a threshold number, thereby maintaining a relatively small memory footprint. The network component 306 can provide a number of wrapping functions to set IP addresses, IP routing tables, and to enable or disable a network interface card. The management component can report the location of the portable telephone 300 to the proxy server 106 and can also communicate with the proxy server 106 when the user of the portable telephone 300 submits a request to view nearby portable telephones that are executing other instances of the application 302. Additionally, if a nearby portable telephone that is executing the application 302 indicates to the proxy server 106 that such portable telephone desires to establish a peer-to-peer connection with the portable telephone 300, the management component 308 can receive communications from the proxy server 106, enable a Wi-Fi radio, and set up the peer-to-peer connection.

Figure 4:
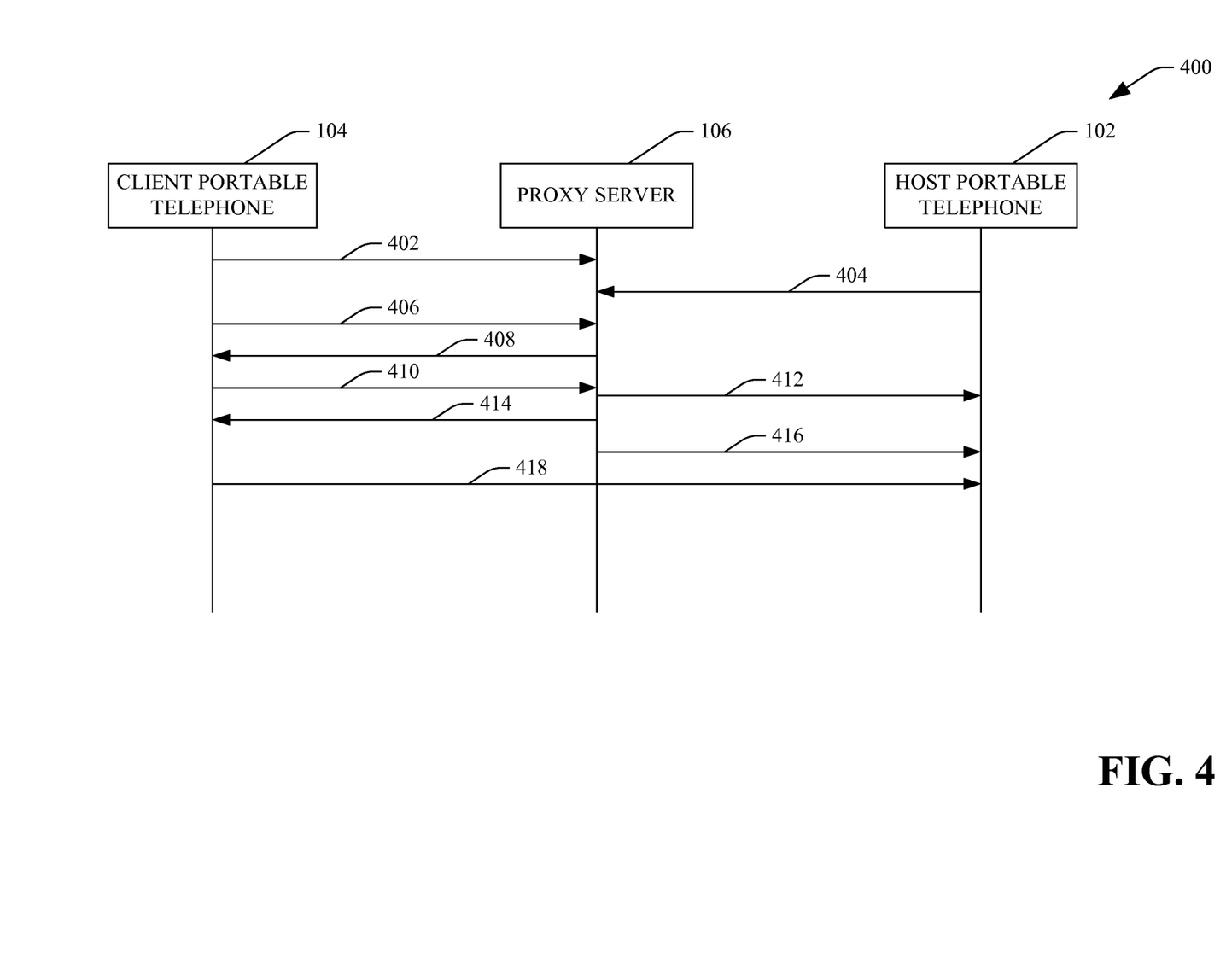
FIG. 4 is a control flow diagram illustrates communications undertaken between a first portable telephone, a proxy server, and a second portable telephone in connection with establishing a peer-to-peer connection between the first portable telephone and the second portable telephone.

With reference now to FIG. 4, an exemplary control flow diagram 400 that illustrates communications undertaken between the host portable telephone 102, the client portable telephone 104, and the proxy server 106 is illustrated. Prior to the client portable telephone 104 and the host portable telephone 102 communicating with the proxy server 106, the user of the client portable telephone 104 and the host portable telephone 102 can create an account with a application or service that enables peer-to-peer communication between the host portable telephone 102 and the client portable telephone 104. During such account creation, the users of the client portable telephone 104 and the host portable telephone 102, respectively, can select or be provided usernames that uniquely identify such users. A "friendly" username can be returned to a portable telephone when a search results in determining that a portable telephone utilized by the owner of the "friendly" username is within wireless communication range of the searching telephone. At 402, the client portable telephone 104 can transmit data that is indicative of the location of the client portable telephone 104 to the proxy server 106 by way of the second cellular network data connection. At 404, the host portable telephone 102 can likewise transmit data that is indicative of the location of the host portable telephone 102 to the proxy server 106 by way of the first cellular network data connection. In addition to transmitting the data that indicates the location of the host portable telephone 102, the host portable telephone 102 can transmit a profile to the proxy server 106.

Accordingly, at this point, the proxy server 106 includes data that indicates the location of the client portable telephone 104, data that indicates the location of the host portable telephone 102, as well as the profile that may be indicative of content that is shareable on the host portable telephone.

At 406, the client portable telephone 104 transmits a location-based query to the proxy server 106. The location-based query is utilized to locate other portable telephones that are in wireless communication range of the client portable telephone 104. Responsive to receiving a location-based request, the proxy server 106 can estimate whether or not the host portable telephone 102 is within wireless communication range of the client portable telephone 104. In other words, the proxy server 106 generates a list of portable telephones that are estimated to be within wireless communication range of the client portable telephone 104. In this exemplary control flow diagram 400, the proxy server 106 can estimate that the host portable telephone 102 is within wireless communication range of the client portable telephone 104.

At 408, subsequent to identifying portable telephones that are estimated to be within the wireless communication range of the client portable telephone 104, the proxy server 106 causes a list of such portable telephones (in the form of a list of the friendly user names) to be transmitted to the client portable telephone 104 by way of the second cellular network data connection. Additionally, the proxy server 106 can provide profiles to the client portable telephone 104 by way of the second cellular network data connection.

The second user of the client portable telephone 104 may then review the list of user names that are found to be within the wireless communication range of the client portable telephone 104. The second user reviews these profiles and can select a particular user name of interest. For example, the client portable telephone 104 can ascertain that a particular user that has been identified as having a portable telephone that is in wireless communication range of the client portable telephone 104 has similar interests to such user, has a file residing on their phone that is of interest to the user, or the like. For instance, the user of the client portable telephone 104 can desire to receive data from the host portable telephone 102, and can indicate such desire by selecting a username corresponding to the host portable telephone 102. This selection of the username can be transmitted to the proxy server at 410 over the second cellular network data connection. Optionally, the client portable telephone 104 can activate its own Wi-Fi radio.

The proxy server 106 receives this request from the client portable telephone 104 to connect to the host portable telephone 102, and responsive to receipt of such request, the proxy server 106 can transmit a message at 412 to the host portable telephone 102 that causes the host portable telephone 102 to activate its Wi-Fi card.

Subsequent to the Wi-Fi radios of the host portable telephone 102 and the client portable telephone 104 being activated, the host portable telephone 102 and the client portable telephone 104 can connect to an appropriate SSID, obtain an IP address, and learn the IP address of the other phone. In an exemplary embodiment, all portable phones utilizing the aforementioned application can utilize a substantially similar SSID. Subsequent to the phones obtaining the appropriate SSID, the proxy server at 414 and 416 can assign nonconflicting IP addresses to the client portable telephone 104 and the host portable telephone 102, respectively. In an exemplary embodiment, at 416, the proxy server 106 can instruct the Wi-Fi radio on the host portable telephone 102 to be activated and also assign a link local IP address to the host portable telephone 102. This address remains valid only until the Wi-Fi connection is turned off. Moreover, the proxy server 106 can indicate to the client portable telephone 104 the IP address of the host portable telephone 102. At 418, subsequent to a Wi-Fi connection being established between the client portable telephone 104 and the host portable telephone 102 in a peer-to-peer fashion, the client portable telephone 104 can access hosted content over IP from the host portable telephone 102. If, while the client portable telephone 104 has a peer-to-peer connection with the host portable telephone 102, another portable telephone requests access to the host portable telephone 102, the proxy server 106 can keep track of IP addresses assigned to portable telephones and can provide these other portable telephone with the IP address assigned to the host portable telephone 102. Pursuant to an example, IP address leases can be employed to assist the proxy server 106 in keeping track of IP addresses assigned to portable telephones. For example, a phone, after having been assigned an IP address can report to the proxy server 106 within some threshold amount of time, whether it is still actively using its Wi-Fi radio. If the phone does not renew its lease, the proxy server 106 can have knowledge that the Wi-Fi is no longer in use and can return the IP address to an IP address pool.

Figure 5:
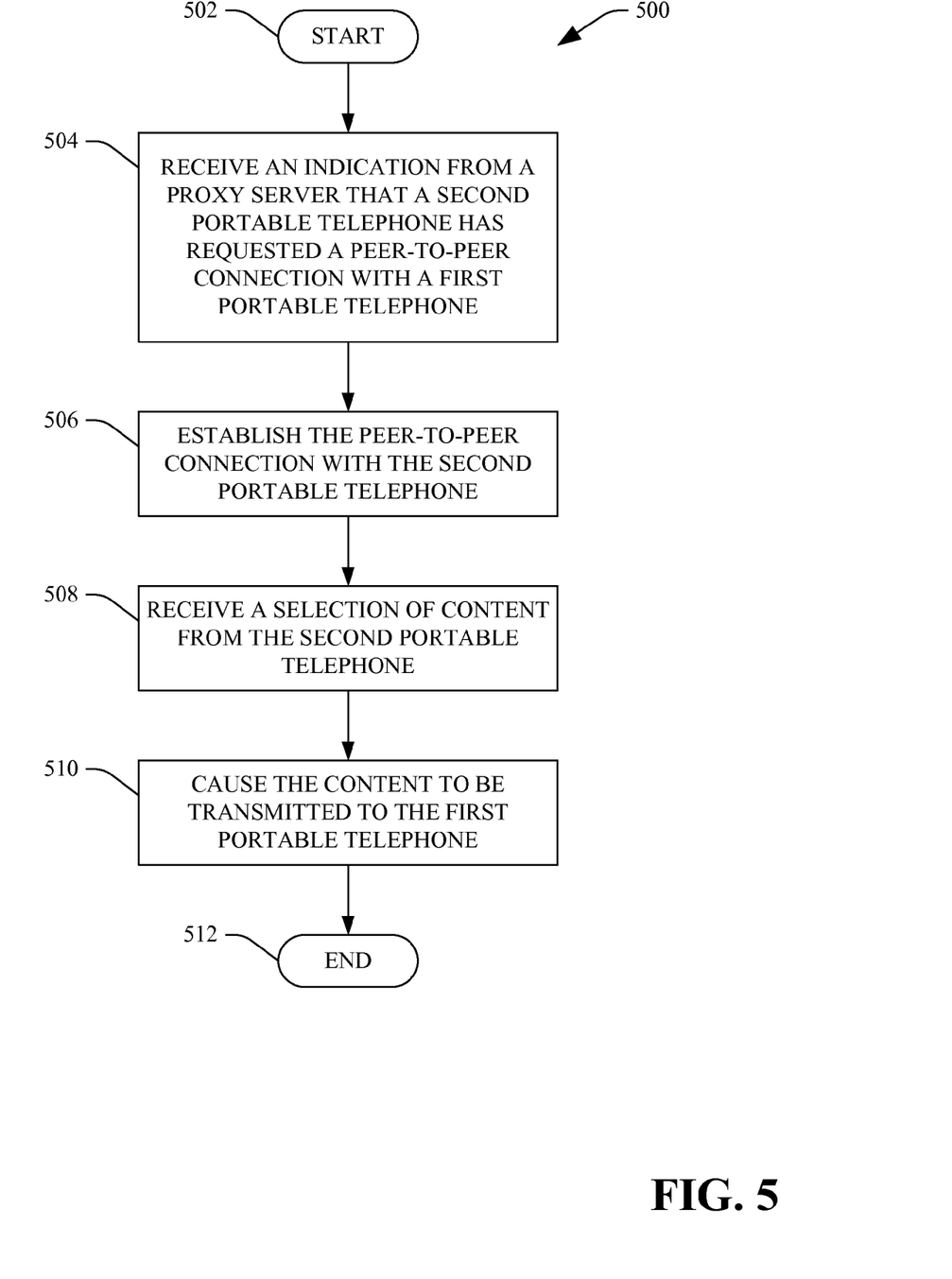
FIG. 5 is a flow diagram that illustrates an exemplary methodology for sharing content by way of a peer-to-peer connection between portable telephones.
Figure 6:
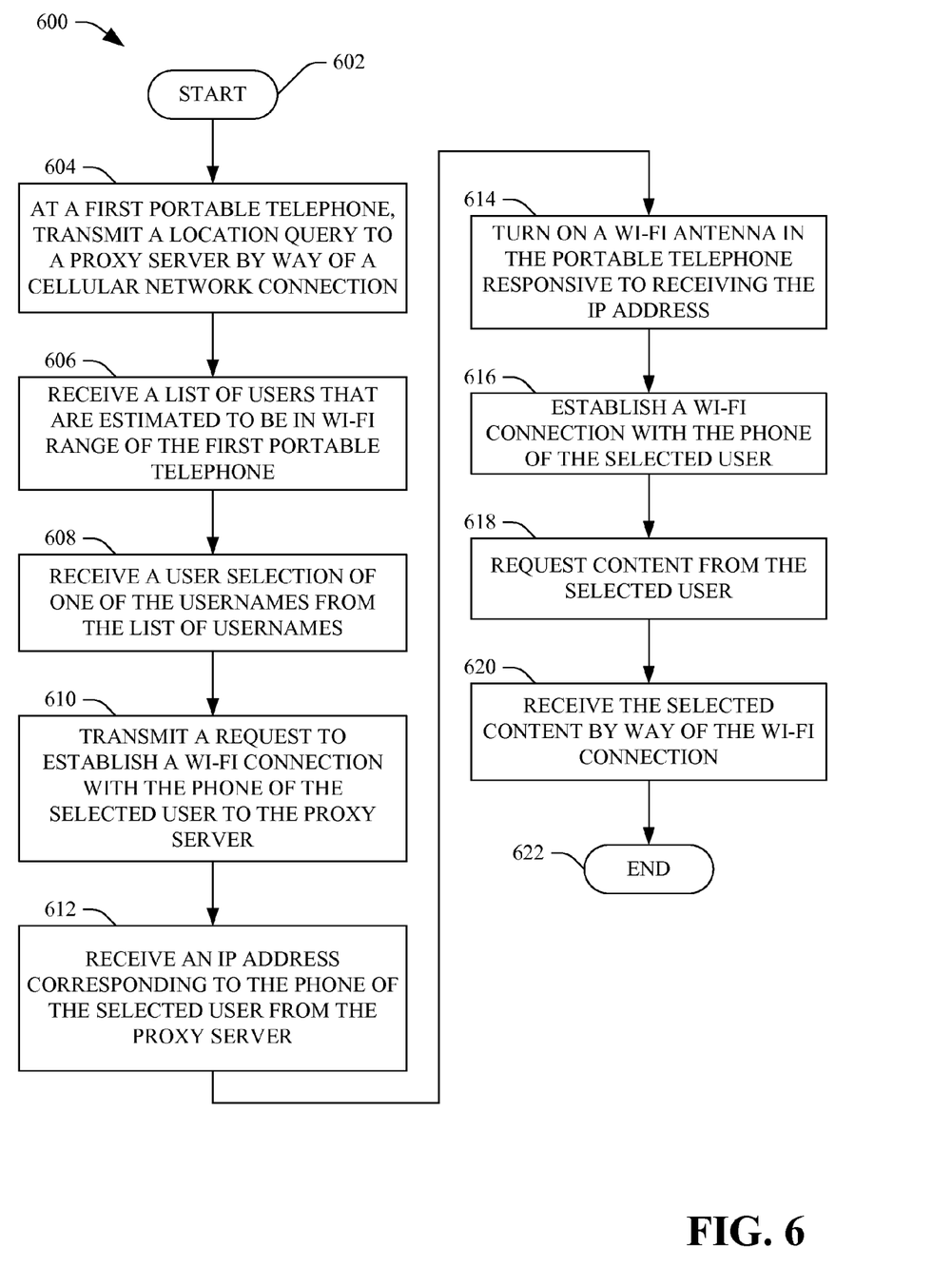
FIG. 6 is a flow diagram that facilitates establishing a peer-to-peer connection from a first portable telephone to a second portable telephone.
Figure 7:
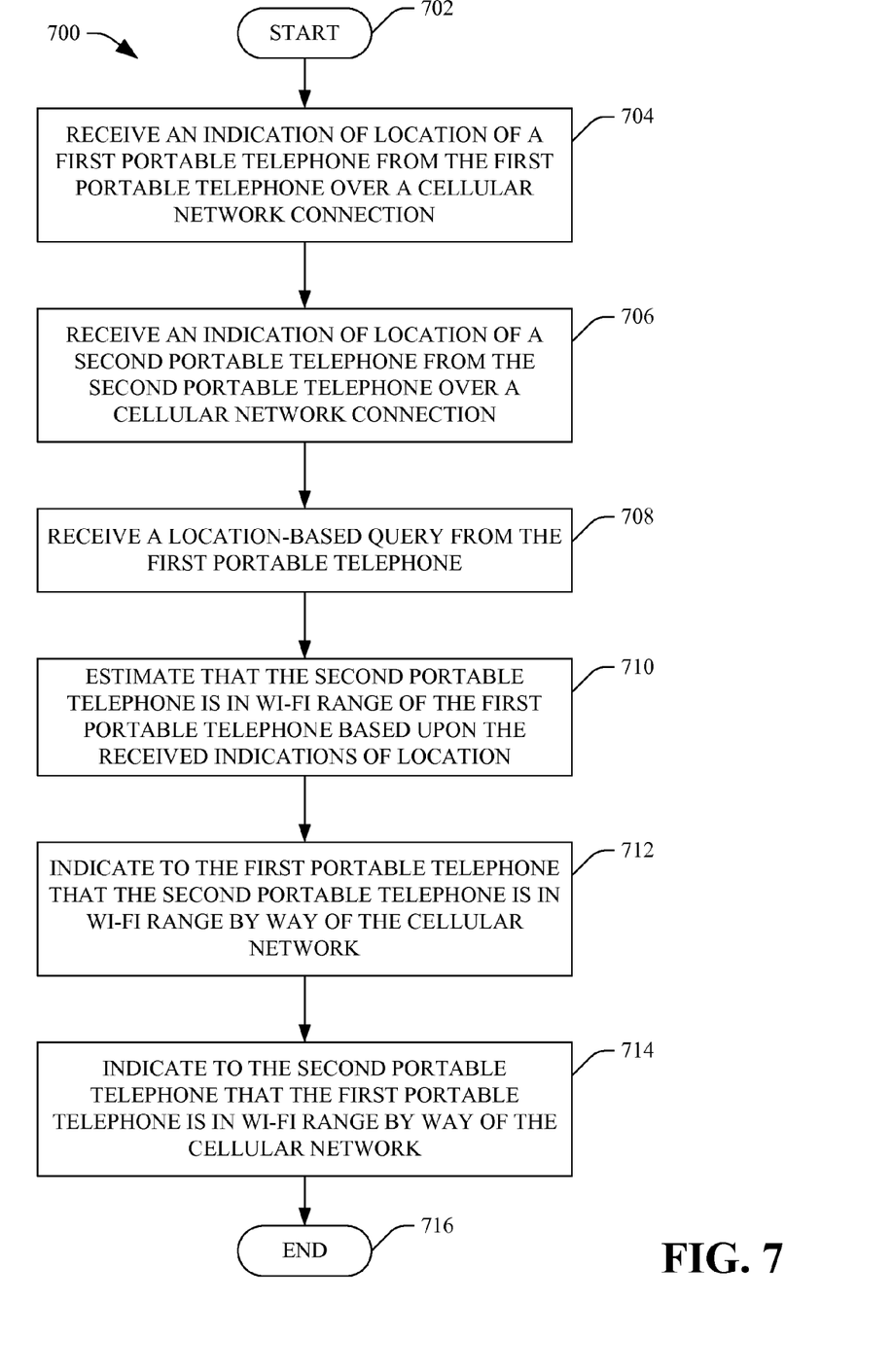
FIG. 7 is a flow diagram that illustrates an exemplary methodology for estimating whether two portable telephones are within wireless communication range of one another.

With reference now to FIGS. 5-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

With reference now to FIG. 5, an exemplary methodology 500 that facilitates transfer of content between two portable telephones by way of a peer-to-peer connection is illustrated. For instance, the methodology 500 can be configured for execution on a host portable telephone. The methodology 500 starts at 502, and at 504 an indication is received at a first portable telephone from a proxy server that a second portable telephone has requested a peer-to-peer connection with the first portable telephone. For example, this indication can be received by way of a cellular network data connection, such as a 3G or 4G network connection.

At 506, responsive to receiving the indication, a peer-to-peer connection is established with the second portable telephone. For instance, this peer-to-peer connection may be a Wi-Fi connection.

At 508, subsequent to establishing a peer-to-peer connection with the second portable telephone, a selection of content on the first portable telephone can be received from the second portable telephone. Pursuant to an example, the first portable telephone can act as a web server, and a user of the second portable telephone can access a web page hosted on such web server. The user of the second portable telephone may then select particular content by selecting a link on the web page that is hosted at the first portable telephone.

At 510, responsive to receiving a selection of the content from the second portable telephone, the content is caused to be transmitted to the second portable telephone. For instance, this content may be a video, an image, streaming video, streaming audio, or the like. The methodology 500 completes at 512.

With reference now to FIG. 6, another exemplary methodology 600 that facilitates transferring rich content by way of a peer-to-peer connection between portable telephones is illustrated. For example, this methodology may be configured for execution on a client portable telephone. The methodology 600 starts at 602, and at 604 at a first portable telephone, a location-based query is transmitted to a proxy server by way of a cellular network data connection. This location-based query may be a request to locate portable telephones that are estimated to be within a wireless communication range of such portable telephone.

At 606, a list of users that are estimated to have portable telephones that are in Wi-Fi range of the force portable telephone is received. This list can be in the form of a plurality of selectable graphical icons that are representative of the users that are estimated to have portable telephones within the Wi-Fi range of the first portable telephone. Moreover, this list can be a list of friendly usernames.

At 608, a user selection of one of the user names from the list of user names is received. At 610, a request is transmitted to a proxy server by way of the cellular network data connection to establish a Wi-Fi connection with a portable telephone of the selected user. At 612, subsequent to transmitting such request, an IP address that has been assigned to a portable telephone utilized by the selected user is received from the proxy server by way of the cellular network data connection.

At 614, a Wi-Fi antenna on the first portable telephone is activated responsive to or prior to receiving the IP address.

At 616, a Wi-Fi connection that is established with the portable telephone that is utilized by the selected user. At 618, a request for content on the portable telephone of the selected user is transmitted from the first portable telephone. For instance, this content may be a file has been labeled as being shareable by the user of the selected portable telephone.

At 620, the selected content is received from the portable telephone of the selected user by way of the Wi-Fi connection, and the methodology 600 completes at 622.

With reference now to FIG. 7, another exemplary methodology 700 that facilitates establishing a peer-to-peer connection between portable telephones is illustrated. Pursuant to an example, the methodology 700 may be configured for execution on a proxy server that is in communication with portable telephones by respective cellular network data connections. The methodology 700 starts at 702, and at 704 an indication of location of a first portable telephone is received from the first portable telephone over a first cellular network data connection. At 706, an indication of the location of a second portable telephone is received from the second portable telephone by way of a second cellular network data connection.

At 708, a location-based query is received from the first portable telephone. Specifically, a request is received from the first portable telephone to provide a first portable telephone with a list of friend users (in the form of friendly usernames) that are utilizing portable telephones that are in wireless communication range of the first portable telephone. At 710, the second portable telephone is estimated to be in Wi-Fi range of the first portable telephone based upon the indications of location received at 704 and 706. It is be understood that any suitable algorithm can be utilized in connection with estimating whether the first portable telephone and the second portable telephone are in Wi-Fi range of one another.

At 712, an indication is transmitted to the first portable telephone that the second portable telephone is in Wi-Fi range, wherein such indication is transmitted by way of the first cellular network data connection. At 714, an indication is transmitted to the second portable telephone that the first portable telephone is in Wi-Fi range of the second portable telephone by way of the second cellular network data connection. Specifically, at 714, the indication to the second portable telephone can instruct the second portable telephone to activate its Wi-Fi radio and to indicate to the second portable telephone that the first portable telephone desires a peer-to-peer connection therewith. The methodology 700 completes at 716.

Figure 8:
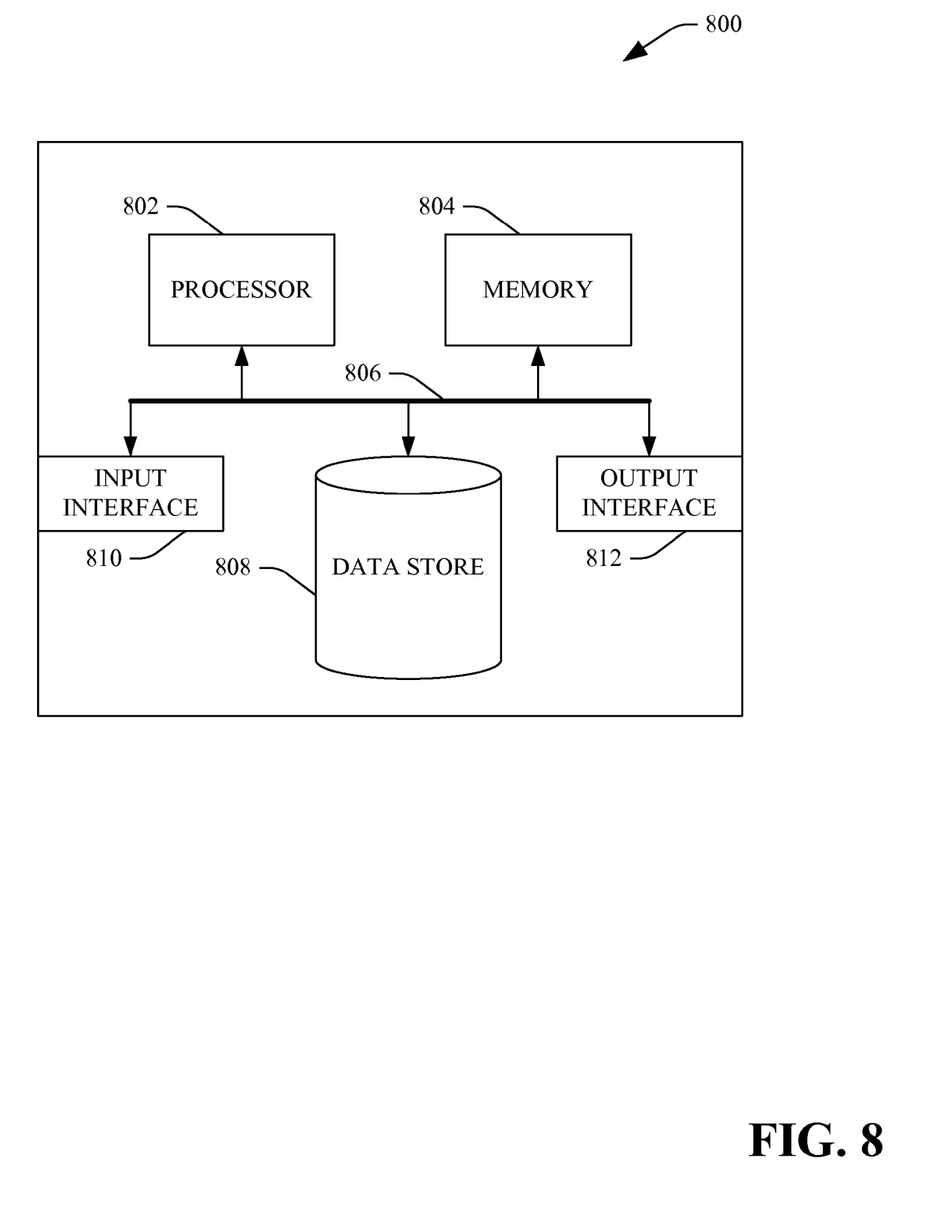
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports transfer of rich content between portable telephones. In another example, at least a portion of the computing device 800 may be used in a system that supports assigning IP addresses to portable telephones. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store location-related data, friendly usernames, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, location data, friendly usernames, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method for retrieving shareable content hosted by a host mobile telephone, the method executed by a client mobile telephone, the method comprising:
   when a wireless radio of the client mobile telephone is powered off, receiving:
      an indication that the host mobile telephone and the client mobile telephone are estimated to be at a distance from one another such that a wireless peer-to-peer connection is able to be established between the host mobile telephone and the client mobile telephone; and
      an identity of the shareable content hosted by the host mobile telephone;
   responsive to receiving the indication and the identity of the shareable content, powering on the wireless radio of the client mobile telephone;
   responsive to powering on the wireless radio of the client mobile telephone, establishing the wireless peer-to-peer connection with the host mobile telephone by way of the wireless radio;
   transmitting a request to the host mobile telephone over the wireless peer-to-peer connection, the request identifies the shareable content; and
   receiving the shareable content from the host mobile telephone by way of the wireless peer-to-peer connection.

2. The method of claim 1, wherein the shareable content is one of an audio file or a video file.

3. The method of claim 1, wherein the wireless peer-to-peer connection is a Wi-Fi connection.

4. The method of claim 1, wherein the shareable content is a streaming media file captured by the host mobile telephone.

5. The method of claim 1, further comprising:
   retrieving, by way of a web browser that is executing on the client mobile telephone, a web page hosted by the host mobile telephone, wherein the web page comprises a link to the shareable content;
   receiving a selection of the link; and
   receiving, by way of the wireless radio, the shareable content from the host mobile telephone responsive to receiving the selection of the link.

6. The method of claim 1, wherein the indication is received by way of a cellular network.

7. The method of claim 1, wherein the indication is received from a computing device other than the host mobile telephone.

8. The method of claim 7, further comprising, prior to receiving the indication from the computing device, transmitting data to the computing device that is indicative of a location of the client mobile telephone.

9. The method of claim 8, wherein the data comprises at least one of:
   latitude/longitude coordinates of the client mobile telephone; or
   a strength of a signal received by the client mobile telephone from a base station, wherein the signal is received at the client mobile telephone by way of a cellular network.

10. The method of claim 1, further comprising:
   subsequent to receiving the shareable content, receiving a second indication that:
      a second mobile telephone is estimated to be at a distance from the client mobile telephone such that a second wireless peer-to-peer connection is able to be established between the client mobile telephone and the second mobile telephone; and
      the second mobile telephone has requested the shareable content;
   responsive to receiving the second indication, establishing the second wireless peer-to-peer connection with the second mobile telephone;
   subsequent to establishing the second wireless peer-to-peer connection with the second mobile telephone, receiving a request for the shareable content from the second mobile telephone; and
   responsive to receiving the request for the shareable content from the second mobile telephone, transmitting the shareable content to the second mobile telephone by way of the second wireless peer-to-peer connection.

11. The method of claim 1, further comprising, prior to receiving the indication, transmitting a request to a computing device other than the host mobile telephone for identities of mobile computing devices estimated by the computing device to be within wireless communications range of the client mobile telephone.

12. The method of claim 11, further comprising:
receiving data identifying mobile computing devices estimated by the computing device to be in wireless communications range of the client mobile telephone, wherein the host mobile telephone is one of the mobile computing devices;
responsive to receiving the data, displaying a listing of the mobile computing devices on a display of the client mobile telephone; and
receiving a selection of the host mobile telephone from amongst the listing of mobile computing devices, wherein the peer-to-peer connection is established responsive to receiving the selection of the host mobile telephone from amongst the listing of mobile computing devices.

13. The method of claim 1, further comprising receiving a first IP address assigned to the client mobile telephone and a second IP address assigned to the host mobile telephone, the first IP address and the second IP address received from a computing device other than the host mobile telephone, wherein the wireless radio is powered on responsive to receiving the first IP address and second IP address.

14. A client mobile computing device, comprising:
at least one processor; and
memory storing instructions that, when executed by the at least one processor, cause the at least one processor to perform acts comprising:
when a wireless radio of the client mobile computing device is powered off, receiving:
an indication that a host mobile computing device is estimated to be at distance from the client mobile computing device such that a wireless peer-to-peer connection is able to be established between the host mobile telephone and the client mobile computing device; and
an identity of shareable content hosted by the host mobile computing device;
causing the wireless radio of the client mobile computing device to be powered on responsive to receiving an indication that a user of the client mobile computing device has selected the host mobile computing device; and
responsive to the wireless radio being powered on, establishing the wireless peer-to-peer connection with the host mobile computing device by way of the wireless radio; wherein the client mobile computing device receives the shareable content from the host mobile computing device by way of the wireless peer-to-peer connection, the content received responsive to the client mobile computing device transmitting a request for the shareable content to the host mobile computing device over the wireless peer-to-peer connection.

15. The client mobile computing device of claim 14, wherein the wireless peer-to-peer connection is a Wi-Fi connection.

16. The client mobile computing device of claim 14, wherein the indication is received from a computing device other than the host mobile computing device via a cellular network connection.

17. The client mobile computing device of claim 14, the acts further comprising:
transmitting data that is indicative of a location of the client mobile computing device to a computing device other than the host mobile computing device, wherein the indication is received responsive to the data that is indicative of the location of the client mobile computing device being transmitted to the computing device other than the host mobile computing device.

18. The client mobile computing device of claim 14, wherein the content is a streaming media file.

19. The client mobile computing device of claim 14, the acts further comprising:
receiving data identifying mobile computing devices estimated by a computing device other than the host mobile computing device to be in wireless communications range of the client mobile computing device, the host mobile computing device is one of the mobile computing devices; and
displaying a listing of the mobile computing devices on a display of the client mobile computing device, wherein the client mobile computing device receives a selection of the host mobile computing device from amongst the listing of the mobile computing devices.

20. A computer-readable data storage device in a client mobile computing device comprising instructions that, when executed by a processor, cause the processor to perform acts comprising:
receiving profiles for mobile computing devices estimated to be at geographic locations relative to a geographic location of the client mobile computing device such that wireless peer-to-peer connections are able to be established between the client mobile computing device and the mobile computing devices, wherein the profiles describe sharable content on the mobile computing devices;
receiving a selection of a host mobile computing device from amongst the mobile computing devices, wherein a profile of the selected host mobile computing device identifies first content hosted by the host mobile computing device;
responsive to receiving the selection, powering on a wireless radio in the client mobile computing device;
responsive to powering on the wireless radio, establishing a wireless peer-to-peer connection with the host mobile computing device via the wireless radio;
responsive to establishing the wireless peer-to-peer connection with the host mobile computing device, transmitting a request for the first content to the host mobile computing device over the wireless peer-to-peer connection; and
responsive to transmitting the request, receiving the first content from the host mobile computing device by way of the wireless peer-to-peer connection.

* * * * *